United States Patent [19]

Smiley

[11] Patent Number: 5,222,671
[45] Date of Patent: Jun. 29, 1993

[54] FLUID DISTRIBUTION APPARATUS

[76] Inventor: Howard F. Smiley, 3243 W. Spruce Ave., Fresno, Calif. 93711

[21] Appl. No.: 877,744

[22] Filed: May 4, 1992

[51] Int. Cl.⁵ ............................. B05B 1/14; B05B 1/30
[52] U.S. Cl. .................................. 239/533.1; 239/542
[58] Field of Search ............................ 239/533.1, 542

[56] References Cited

U.S. PATENT DOCUMENTS

| | | |
|---|---|---|
| 2,554,790 | 5/1951 | Miller . |
| 3,693,888 | 9/1972 | Rondas et al. . |
| 3,767,124 | 10/1973 | Spencer ........................ 239/542 |
| 3,810,582 | 4/1974 | Lodge .......................... 239/542 |
| 3,863,845 | 2/1975 | Bumpstead ................... 239/542 |
| 3,873,031 | 3/1975 | Reeder et al. . |
| 3,908,694 | 9/1975 | Spears . |
| 3,954,223 | 5/1976 | Wichman et al. . |
| 4,161,291 | 7/1979 | Bentley . |
| 4,226,368 | 10/1980 | Hunter ......................... 239/542 |
| 4,344,576 | 8/1982 | Smith . |
| 4,589,595 | 5/1986 | Havens . |
| 4,613,080 | 9/1986 | Benson et al. ................ 239/542 |
| 4,627,573 | 12/1986 | Havens . |
| 4,660,769 | 4/1987 | Rosenberg .................... 239/542 |
| 4,687,143 | 8/1987 | Gorney et al. ................ 239/542 |
| 4,688,599 | 8/1987 | Zeman . |
| 4,869,432 | 8/1989 | Christy ........................ 239/542 |
| 5,054,690 | 10/1991 | Olson . |

FOREIGN PATENT DOCUMENTS

2035024 6/1980 United Kingdom ............ 239/53.1

Primary Examiner—Andres Kashnikow
Assistant Examiner—Lesley D. Morris
Attorney, Agent, or Firm—Worrel & Worrel

[57] ABSTRACT

A fluid regulating apparatus adapted operably to be connected to a source of fluid under pressure, the apparatus having a housing having an internal chamber and at least one passage interconnecting the chamber and the exterior of the housing; a mount for mounting the chamber of the housing in fluid receiving relation to the source of fluid under pressure; and an assembly mounted in the housing responsive to fluid pressure to reduce the fluctuation in the volume of fluid released from the chamber through the passage as the result of fluctuation in the fluid pressure received from the source.

17 Claims, 5 Drawing Sheets

FLUID DISTRIBUTION APPARATUS

BACKGROUND OF THE INVENTION

1. Field of the Invention

The present invention relates to a fluid regulating apparatus and, more particularly, to such a fluid regulating apparatus which is particularly well suited to the discriminate control of fluid release through multiple outlets to discrete destinations.

2. Description of the Prior Art

With the advent of a recognition of the need for conservation of natural resources, have come industries devoted to achieving such conservation without a significant loss of benefit from the natural resources so conserved. In the case of the conservation of water resources, industries have evolved whose objectives are to ensure significant reductions in water consumption while incurring little or no loss in benefit as a result. Drip and low volume irrigation is increasingly more extensively employed, particularly in the arid regions of the world, affording the capability for application of significantly reduced volumes of water, but at the precise locations desired. In contrast, predecessor practices included flood irrigation where much of the water employed is wasted by absorption into the earth without consumption by plant life.

Low volume and drip irrigation systems possess a multiplicity of very low volume fluid outlets, or emitters, adapted individually to be positioned adjacent to the individual plants to be watered. However, such systems are subject to a multitude of operational difficulties which must themselves be overcome. For example, in the case of low volume or drip irrigation, very small bore emitters, tubing and the like must be employed which are susceptible to becoming obstructed by fluid borne substances during their operational lives. The multiplicity of such very small bore elements makes the frequent cleaning of such elements very expensive, and in many instances, entirely impractical.

Another problem incident to the operation of such low volume and drip irrigation systems is the fact that most commonly the individual water needs of the individual plants to be irrigated vary both relative to each other and over time so that the low volume or drip irrigation system must possess the capability of individual adjustment of the fluid outlets for control of the volume released therefrom. Conventionally, this is achieved by the replacement of the individual major components, such as emitters, of the system which is both expensive and labor intensive. Each of the major components is of comparatively great expense and when the numbers of such components require a replacement is, as is often the case, a significant percentage of the entire system, the aggregate cost is substantial. Since such major components are not centralized, but rather distributed throughout the entire system, the labor required in replacing those major components is considerably beyond that which would be desirable.

Another chronic problem experienced in conventional low volume and drip irrigation systems is a result of the inherent variability of fluid pressures received from the source of fluid under pressure. Over time, both municipal and private water systems are subject to considerable variations in fluid pressure. For example, in a 24 hour period, fluid pressure in a municipal system may vary over a rather wide range due to a variety of conditions including the variation in demand placed on the system throughout the period. While certain prior art efforts have been directed at providing low volume and drip irrigation systems with a capability of adjusting to fluid pressure to ensure that a relatively constant volume of fluid release is achievable regardless of the actual fluid pressure at any one time, such prior art efforts have not been entirely satisfactory and have not been operable in complement to other operational considerations.

Still another result of the variability in fluid pressures is the reversal of the direction of fluid flow within the system which may draw toxic or otherwise harmful substances into the system or may draw particulate matter into the system leading to the occlusion of fluid orifices within the system. This phenomenon is known as "back flow". While back flow preventers are known in a variety of fluid systems of large bore, the prevention of such back flow in low volume or drip irrigation systems has received very little attention.

Therefore, it is an object of the present invention to provide an improved fluid regulating apparatus which has particular utility in low volume and drip irrigation systems; which is operable to distribute fluid within low volume and drip irrigation systems to multiple distribution points; which possesses the capability for independently adjusting the distribution volumes to the multiple distribution points, both relative to each other and over time; which reduces significantly the cost of adjusting such irrigation systems both as to the cost of the individual elements thereof as well as to the cost of the manual labor required to achieve such adjustment; and which possesses the capability of adjusting to variations in fluid pressure within the system and thereby avoiding the negative consequences associated therewith.

SUMMARY OF THE INVENTION

Therefore, it is an object of the present invention to provide an improved fluid regulating apparatus.

Another object is to provide such a fluid regulating apparatus which is particularly well suited to use in low volume and drip irrigation systems to achieve the most effective and dependable usage of fluid distributed therethrough.

Another object is to provide such a fluid regulating apparatus which possesses the capability of independently adjusting the volume of fluid distributed through a multiplicity of individual fluid outlets in response to variations in fluid pressure within the system.

Another object is to provide such a fluid regulating apparatus which possesses the capability of having a different volume of fluid distributed through each of the multiplicity of fluid outlets thereof and which still further can be adjusted over time to vary the quantity of fluid distributed through one or more of the fluid outlets.

Another object is to provide such a fluid regulating apparatus which significantly reduces the manual labor required, as well as the cost of the individual elements thereof, in adjusting such an irrigation system to achieve different rates of flow.

Another object is to provide such a fluid regulating apparatus which prevents the reversal of direction of fluid within the system as a result of the variability of fluid pressures within the system so as to preclude drawing toxic or otherwise harmful substances into the system and avoiding the occlusion of fluid orifices within the system as a result of drawing particulate matter into the system.

Another object is to provide such a fluid regulating apparatus which affords all of the operative advantages thereof while being inexpensive to purchase and convenient to install, to service and to adjust.

Further objects and advantages are to provide improved elements and arrangements thereof in an apparatus for the purpose described which is dependable, economical, durable and fully effective in accomplishing its intended purpose.

These and other objects and advantages of the fluid regulating apparatus of the present invention are achieved, in the preferred embodiment thereof, in an apparatus having a housing with an internal chamber and at lest one passage interconnecting the chamber and the exterior of the housing; a mount for securing the chamber of the housing in fluid receiving relation to a source of fluid under pressure; and an assembly mounted in the housing responsive to fluid pressure to reduce the fluctuation in volume of fluid released from the chamber through the passage as the pressure of fluid received from the source fluctuates.

DESCRIPTION OF THE PREFERRED EMBODIMENTS

FIRST EMBODIMENT

Figure 1:
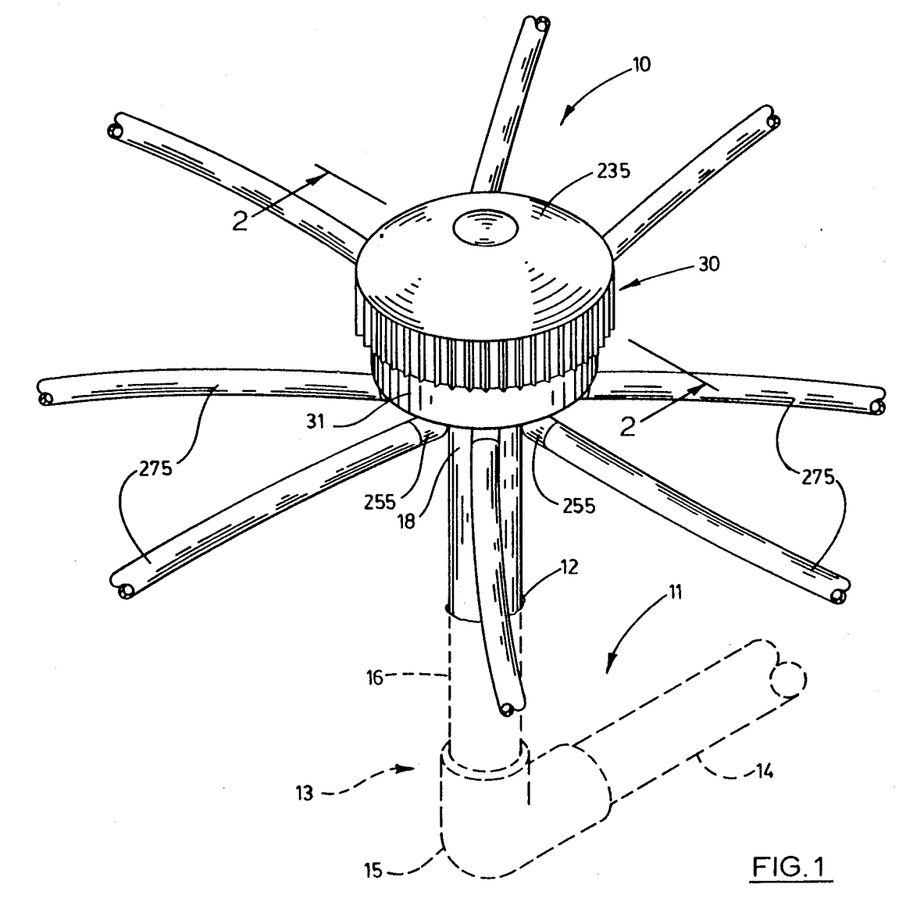
FIG. 1 is a fragmentary perspective view of the fluid regulating apparatus of the present invention shown in a typical operative environment.

The first embodiment of the fluid regulating apparatus of the present invention is generally indicated by the numeral 10 and shown in FIGS. 1 through 6. Referring more particularly to FIG. 1, the fluid regulating apparatus 10 is shown in a typical operative environment wherein the earth is indicated at 11 and the earth's surface at 12. A fluid supply system or irrigation system is indicated at 13 buried in the earth. The irrigation system has a conduit fragmentarily shown at 14 which is connected to a source of fluid under pressure such as, for example, a municipal water supply. An elbow 15 is mounted on the conduit in which, in turn, is mounted a riser 16 extending through and above the earth's surface 12. The riser has an internal passage 17, an upper end portion 18 with an annulus 19 bounding an opening 20 of the riser. The upper end portion 18 of the riser is circumscribed by external screw threads 21.

The fluid regulating apparatus 10 of the first embodiment has a main housing 30 including a substantially cylindrical housing body 31 with a cylindrical wall 32. The cylindrical wall has an outer cylindrical surface 33 and a lower annulus 34. The housing body has an upper annulus 35. An external screw thread 36 extends about the outer cylindrical surface of the cylindrical wall 32. The housing body has a bottom wall 37.

A female coupling 45 is mounted on and extends from the bottom wall 37 of the housing body 31 substantially concentric to the cylindrical wall 32. The female coupling has a cylindrical wall 46 having an internally screw threaded passage 47 bounded at its outer extremity by an outer annulus 48. A plurality of radial vanes 49 extend from the cylindrical wall 46 outwardly to interconnect with the lower annulus 34 of the cylindrical wall 32. The female coupling and housing body are concentric to a first axis of reference 50 shown in FIG. 2.

A plurality of fluid discharge couplings 55 are formed on the bottom wall 37 of the housing body 31 in evenly spaced relation to each other and together defining an annulus concentric to the first axis of reference. In the embodiment of the invention shown and described herein, there are eight such fluid discharge couplings. Each of the fluid discharge couplings has a cylindrical wall 56 bounding an internal passage 57. The cylindrical wall has an internal surface 58 which is substantially cylindrical and includes an annular seat 59. The internal passage of each fluid discharge coupling has an internal sealing annulus 60 and is bounded at its outer end by an outer annulus 61.

Figure 2:
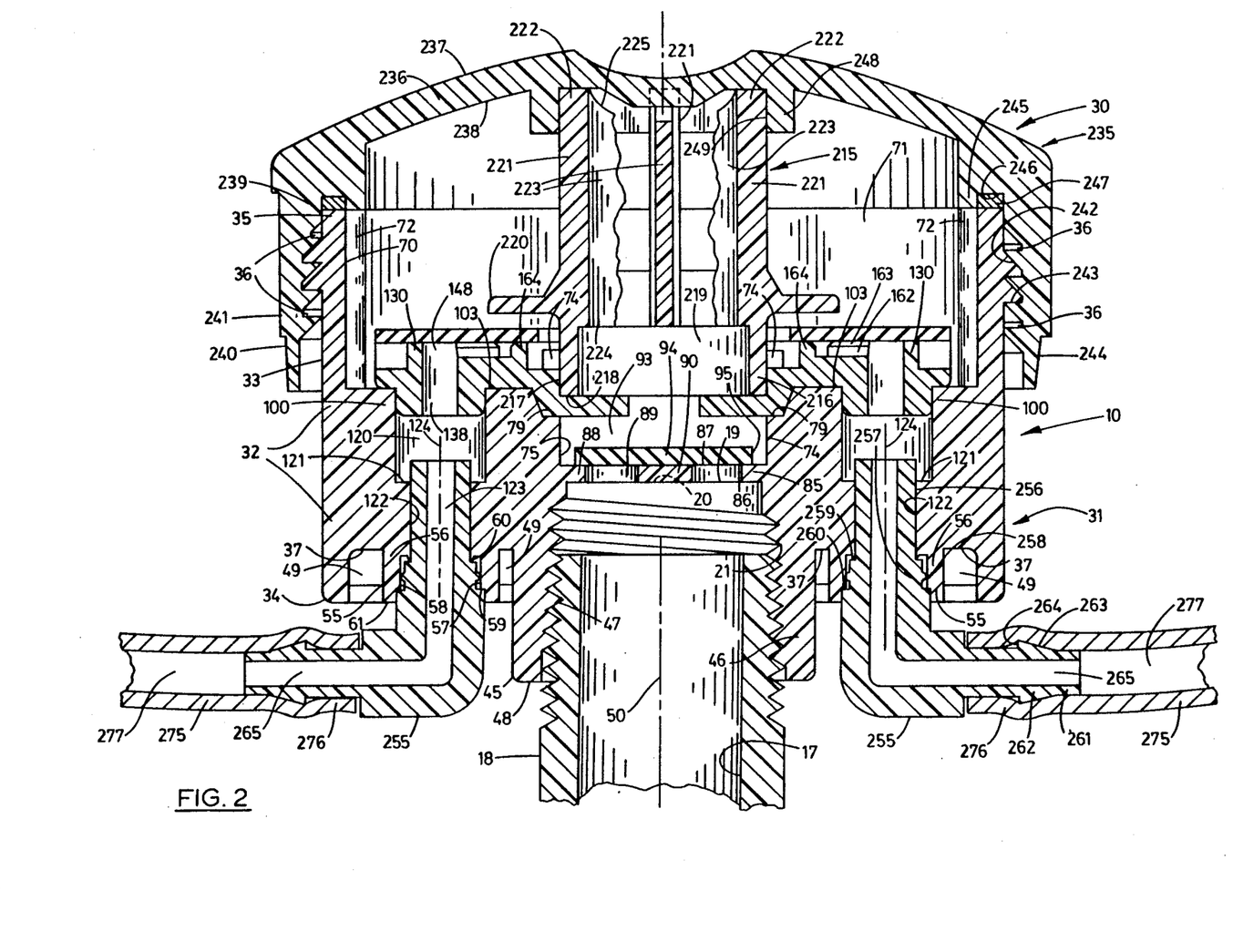
FIG. 2 is a somewhat enlarged, fragmentary transverse vertical section of the fluid regulating apparatus taken on line 2—2 in FIG. 1.
Figure 3:
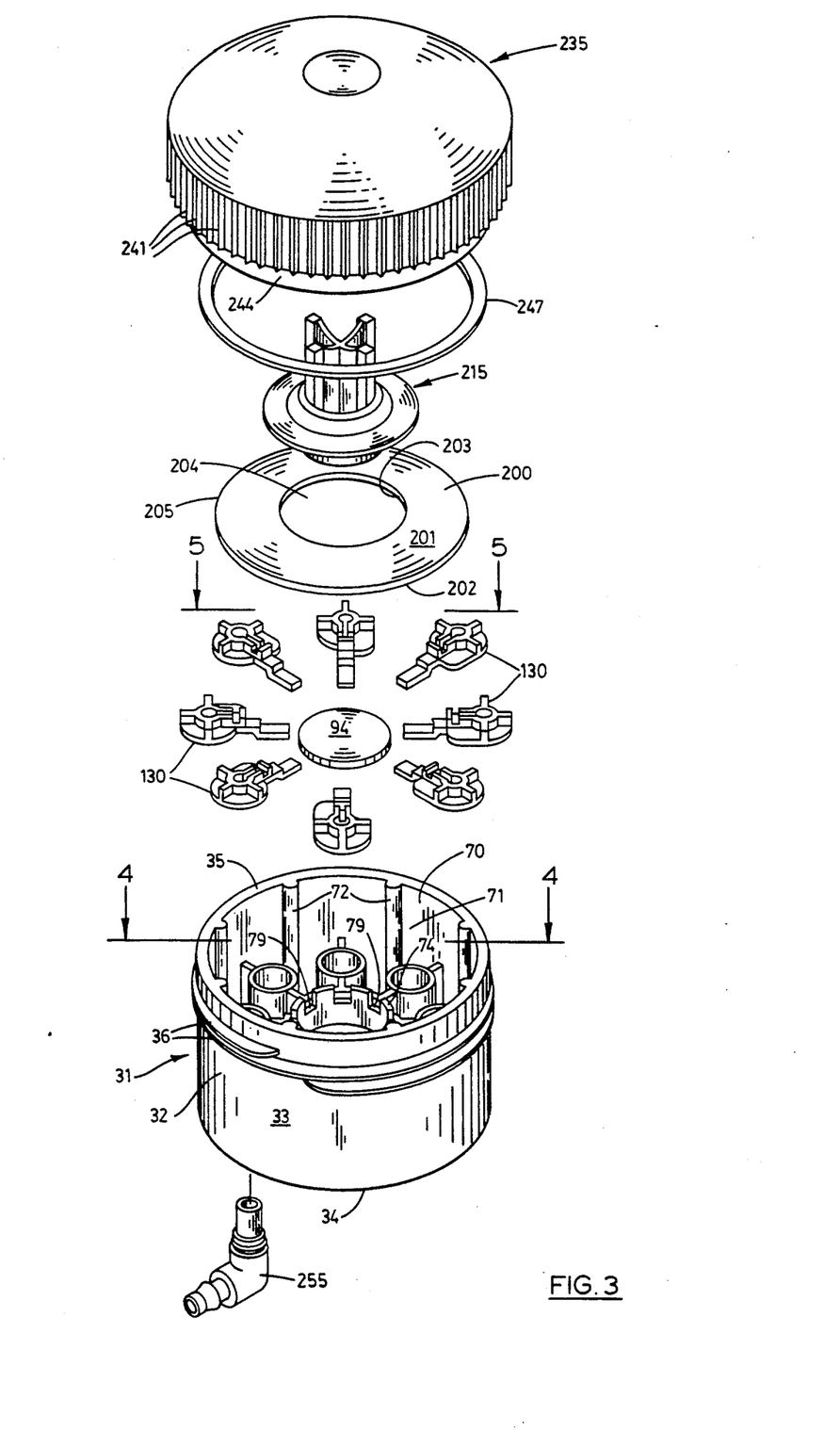
FIG. 3 is an exploded perspective view of the fluid regulating apparatus.

The cylindrical wall 32 of the housing body 31 has a cylindrical internal surface 70 bounding an internal chamber 71, both of which are concentric to the first axis of reference 50. A plurality of ribs 72 extend longitudinally along the internal surface 70 in spaced, substantially parallel relation to each other, as best shown in FIGS. 2 and 3. The bottom wall 37 of the housing body 31 has a substantially flat internal surface 73. A central cylindrical wall 74 is mounted on and extends upwardly from the internal surface 73 of the bottom wall substantially concentric to the internal surface 70 of the cylindrical wall 32 and to the first axis of reference. The cylindrical wall 74 has an internal passage 75 bounded by a cylindrical internal surface 76. A plurality of ribs 77 are mounted on and extend along the internal surface 76 of the central cylindrical wall 74. The central cylindrical wall has an upper annulus 78 in which are formed a plurality of notches 79, best shown in FIGS. 3 and 4.

A support frame or dividing wall 85 is mounted on the internal surface 76 of the central cylindrical wall extending across the internal passage 75 thereof in the position best shown in FIG. 2. The dividing wall has a lower surface 86 and an opposite upper surface 87 substantially parallel thereto. An annular lip 88 forms the outer part of the dividing wall and bounds an opening 89. A web 90 is mounted on the annular lip and extends across the internal passage 75. The web is composed of three arms 91 extending inwardly from the annular lip toward the center of the passage in radial relation and interconnected by central juncture 92. Thus, the web extends across the opening 89, as can best be seen in FIG. 4. The area within the internal passage 75 of the central cylindrical wall 74 above the dividing wall 85 constitutes a diaphragm chamber 93. A resilient diaphragm 94, having a peripheral edge 95, is rested on the dividing wall, but not otherwise attached to the dividing wall or to any other portion of the fluid regulating apparatus. It will be seen upon reference to FIG. 2 that the periphery of the diaphragm is of a size such that when rested in the position shown in FIG. 2 the opening 89 is entirely obstructed, but the peripheral edge of the diaphragm does not reach the cylindrical surface 76 when the diaphragm is centered on the dividing wall.

Figure 4:
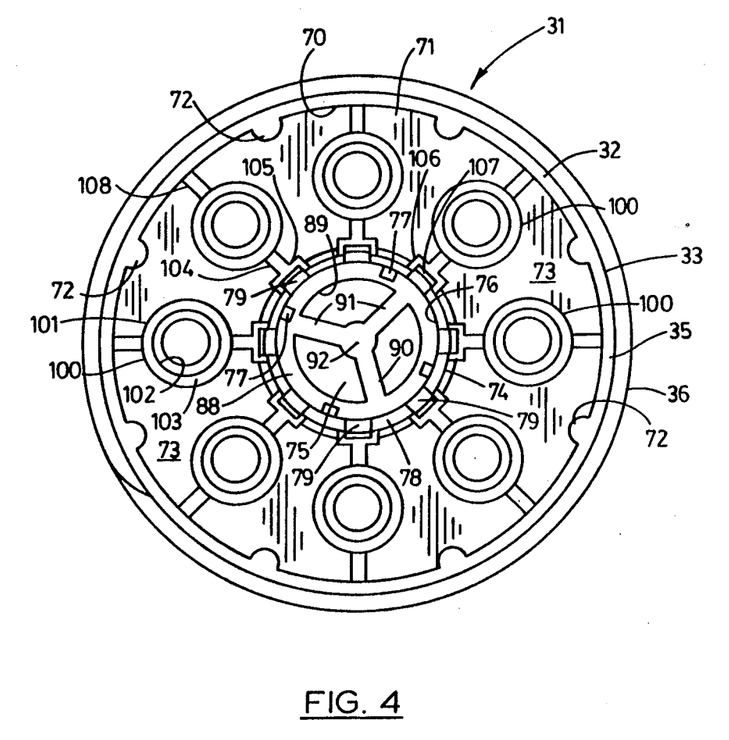
FIG. 4 is a top plan view of the housing body of the fluid regulating apparatus taken from a position by line 4—4 in FIG. 3.

A plurality of fluid discharge cylinders 100 are mounted on the internal surface 73 of the bottom wall 37. Each of the discharge cylinders is aligned with one of the discharge couplings 55 and constitutes an extension thereof within the internal chamber 71 of the housing body 31. In the preferred embodiment there are thus eight (8) such discharge cylinders arranged so as together to define an annulus concentric to the central cylindrical wall 74, as best shown in FIG. 4. Each of the discharge cylinders has a cylindrical external surface 101 and a cylindrical internal surface 102. Each of the discharge cylinders has an upper annulus 103. Each discharge cylinder is connected to the central cylindrical wall 74 by an inner radial wall 104 which is physically joined to the central cylindrical wall by an enlarged rib 105 extending along the central cylindrical wall and having an upper U-shaped end 106. A slot 107 is formed in the upper U-shaped end 106 and communicates with one of the notches 79 in the central cylindrical wall. Each of the discharge cylinders is connected to the internal surface 70 of the cylindrical wall 32 by an outer radial wall 108.

The cylindrical internal surface 102 of each of the fluid discharge cylinders 100 defines a fluid passage 120 bounded at its lower extremity by bottom surface 121. A cylindrical surface 122 defining a cylindrical passage 123 interconnects the fluid passage 120 of each fluid discharge cylinder 100 with the internal passage 57 of its respective fluid discharge coupling 55. Each of the cylindrical passages 123 is concentric to a second axis of reference 124 individual thereto. Similarly, the fluid passage 120 and internal passage 57 associated with each of the cylindrical passages 123 are concentric to the second axis of reference 124 thereof.

Figure 5:
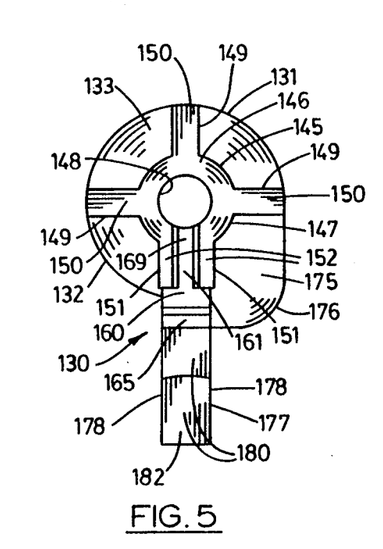
FIG. 5 is a somewhat enlarged top plan view of one of the fluid control elements of the fluid distribution apparatus of the present invention taken from a position indicated by line 5—5 in FIG. 3.

The fluid regulating apparatus 10 has a plurality of fluid control elements 130 mounted therein, as will hereinafter be described in greater detail. In the preferred embodiment shown and described herein, there are eight (8) such fluid control elements, one individual to each of the fluid discharge cylinders 100. The structure of each of the fluid control elements can best be seen upon reference to FIGS. 5 and 6. Each of the fluid control elements has a body portion 131 including a plate 132 having an upper surface 133 and an opposite lower surface 134. A lower cylindrical portion or plug 135 is mounted on and extends from the lower surface 134. The plug has an outer cylindrical surface 136 leading to a rounded annular edge 137. A cylindrical passage 138 extends through the plug. Each of the fluid control elements has an upper cylindrical position or inlet 145 extending upwardly from the upper surface 133 of the plate 132 thereof. The inlet has an upper annulus 146 and an outer cylindrical surface 147. A cylindrical passage 148 extends through the inlet communicating with and constituting an extension of the cylindrical passage 138 of the plug. Three (3) radial vanes 149 are mounted on the upper surface of the plate 132 extending outwardly therefrom at attitudes disposed in right angular relation. The radial vanes have upper surfaces 150. A pair of parallel vanes 151 are mounted on the upper surface of the plate in spaced substantially parallel relation to each other and having upper surfaces 152. The parallel vanes are disposed, as shown in FIG. 5, so that there are corresponding vanes extending substantially radially from the inlet approximately ninety degrees (90°) from each other about the periphery of the inlet.

Figure 6:
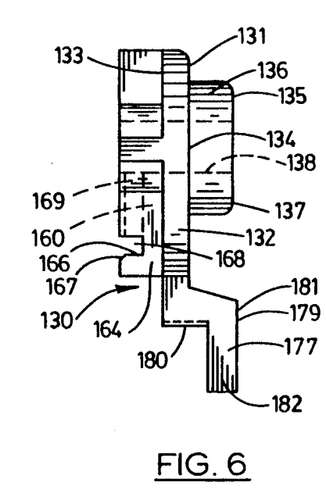
FIG. 6 is a side elevation of the fluid control element shown in FIG. 5.

A base 160 is mounted on the upper surface 133 of the plate 132 of each of the fluid control elements 130. The base extends between the parallel vanes 151 and has an upper surface 161. The parallel vanes have interior parallel surfaces 162 and upper bevelled surfaces 163. A transverse vane 164 is mounted on the upper surface of the plate disposed in substantially right angular relation to the parallel vanes 151 and in spaced relation to the ends thereof, as best shown in FIGS. 5 and 6. The transverse vane has an upper surface 165. The transverse vane has a vertical surface 166 leading to an upper bevelled surface 167. The space between the transverse vane and the ends of the parallel vanes forms a transverse passage 168. The area between the parallel vanes and above the base define a longitudinal passage 169. Thus, a path of fluid movement is defined along the transverse passage, through the longitudinal passage and into the cylindrical passage 48 of the inlet for communication with the cylindrical passage 138 of the plug 135. As can perhaps best be seen in FIG. 5, the upper bevelled surfaces 163 and 167 are convergent downwardly into their respective longitudinal and transverse passages.

Each of the fluid control elements 130 has a platform, or enlarged portion, 175 constituting in effect an enlarged extension of the plate 132 thereof. The enlarged portion has as a periphery 176. Each of the fluid control elements 130 has a capturing arm 177 extending from the plate and enlarged portion. Each capturing arm has substantially parallel opposite sides 178 defining a width adapted to be snapped fitted in one of the notches 79 and slot 107. Each of the capturing arms has a lower surface 179 and a upper surface 180. The lower and upper surfaces are configured, as shown in FIGS. 5 and 6, to define a seating portion 181 and a distal portion 182. Each of the fluid control elements 130 is releasibly mounted in position, as shown in FIG. 2. The seating portion 181 thereof is snap fitted in the notch 79 and slot 107 of its respective fluid discharge cylinder 100 so that the capturing arm 177 thereof extends over the diaphragm chamber 93 in capturing relation to the diaphragm 94.

Similarly, the plug 135 of the fluid control element 130 is snap fitted in the fluid passage 120 just inwardly of the upper annulus 103 of its respective fluid discharge cylinder, as shown in FIG. 2. When so positioned, the transverse passage 168, longitudinal passage 169, and cylindrical passage 148 of the inlet 145 of the fluid control element is disposed in upwardly facing relation, as shown in FIG. 2. It will thus also be seen that the upper surfaces 150 of the radial vanes 149 and upper surfaces 152 of the parallel vanes 150 of all of the fluid control elements are disposed in substantially coplanar relation. When so positioned, the cylindrical passage 148 of each fluid control element is concentric to the respective second axis of reference of the cylindrical passage 123 associated therewith.

A flow control diaphragm 200, having an upper surface 201 and an opposite lower surface 202 and constructed of a resilient material such as rubber or the like is disposed within the internal chamber 71 of the cylindrical wall 32 in rested relation on the upper surfaces 150 of the radial vanes 149, the upper surfaces 152 of the parallel vanes 151 and the upper surfaces 165 of the transverse vanes 164. The flow control diaphragm has a circular interior edge 203 defining an opening 204 and a circular peripheral edge 205 concentric to the circular interior edge.

A frame or core member 215 is mounted within the internal chamber 71 of the housing body 31, as shown best in FIG. 2. The core member has a cylindrical base 216 having a cylindrical outer surface 217, a lower annulus 218 and an internal passage 219. A radial flange 220 extends outwardly from the cylindrical base. Four upright members 121 are extended upwardly from the cylindrical base above the radial flange 220. The upright members have upper ends 222 and are interconnected, as shown best in FIGS. 2 and 3, by vanes 223. The vanes have lower edges 224 and scalloped upper edges 225. The core member is slidably received in the internal passage 75 of the central cylindrical walls 74 at the end thereof bounded by the upper annulus 78. The cylindrical base is so mounted in position extending through the opening 204 in the flow control diaphragm 200 so that the diaphragm is captured in position rested on the flow control elements 130 extending about the cylindrical base 216 of the core member and captured on the side thereof opposite the flow control elements by the radial flange 220, as best shown in FIG. 2.

A closure or lid 235 is removably secured on the housing body 31. The lid has a dome 236 having a convex exterior surface 237 and an opposite, concave interior surface 238. The dome is bounded by cylindrical wall 239 extending therefrom having an exterior surface 240. The exterior surface mounts a plurality of ribs 241 extending longitudinally thereof. The cylindrical wall has an interior surface 242 mounting screw threads 243. A skirt 244 extends endwardly from the cylindrical wall. An interior annulus 245 is mounted on the dome and extends endwardly therefrom substantially concentric to the cylindrical wall 239 and in spaced relation thereto to define a gasket groove 246 in which is removably received a gasket 247. The interior surface of the dome mounts an upper cylindrical wall 248 concentric to the cylindrical wall 239 and having an interior surface 249. The lid is removably mounted on the housing body 31 by the screw threads 243 thereof being screwthreadably secured on the external screw thread 36 of the housing body 31 and tightened into position until the gasket 247 sealingly engages the upper annulus 35 of the housing body 31 thereby rendering the internal chamber 71 of the main housing 30 formed thereby fluid tight. When so secured in position, the upper ends 222 of the upright members 221 are slidably received within the interior 249 of the upper cylindrical wall 248 of the lid. The scalloped upper edges 225 of the vanes 223 arc downwardly from the interior surface 238 of the dome 236 so as to define paths for fluid movement over the vanes and outwardly into the internal chamber 71 of the main housing 30.

A plurality of elbows 255 are individually mounted in the fluid discharge couplings 55, as best shown in FIG. 2. Each of the elbows has a cylindrical mounting portion 256 and a cylindrical sealing portion 257. An annular ring 258 extends about the sealing portion 257. A first shoulder 259 extends about the mounting portion and constitutes part of the sealing portion 257. A second shoulder 260 extends about the sealing portion 257. A conduit mounting portion 261 extends in right angular relation to the cylindrical mounting portion 256 and has an annular ridge 262. The annular ridge has a bevelled surface 263 and a radial surface 264. A passage 265 extends through each elbow, as best shown in FIG. 2. Each elbow is forcibly received in the cylindrical passage 123 in tight facing engagement with the cylindrical surface 122 defining the cylindrical passage so that the mounting portion 256 of the elbow and thereby the passage 265 extends internally of the fluid passage 120 of its respective fluid discharge cylinder 100. In this position, the first shoulder 259 sealingly engages the sealing annulus 60, the second shoulder 260 sealingly engages the annular seat 59 and the annular ring 258 sealingly engages the internal surface 58 of the fluid discharge coupling 55.

A conduit 275 is slidably received about the conduit mounting portion 261 of each elbow 255. The conduit has a mounting portion 276 which is fitted about the conduit mounting portion 261 of its respective elbow in the position shown in FIG. 2 and retained in that position by the annular ridge 262 of the conduit mounting portion. The conduit has a passage 277 extending the length thereof. The remote end of each conduit, not shown, may simply be open to the atmosphere or may, if desired, mount an emitter or other device, not shown, thereon.

SECOND EMBODIMENT

Figure 7:
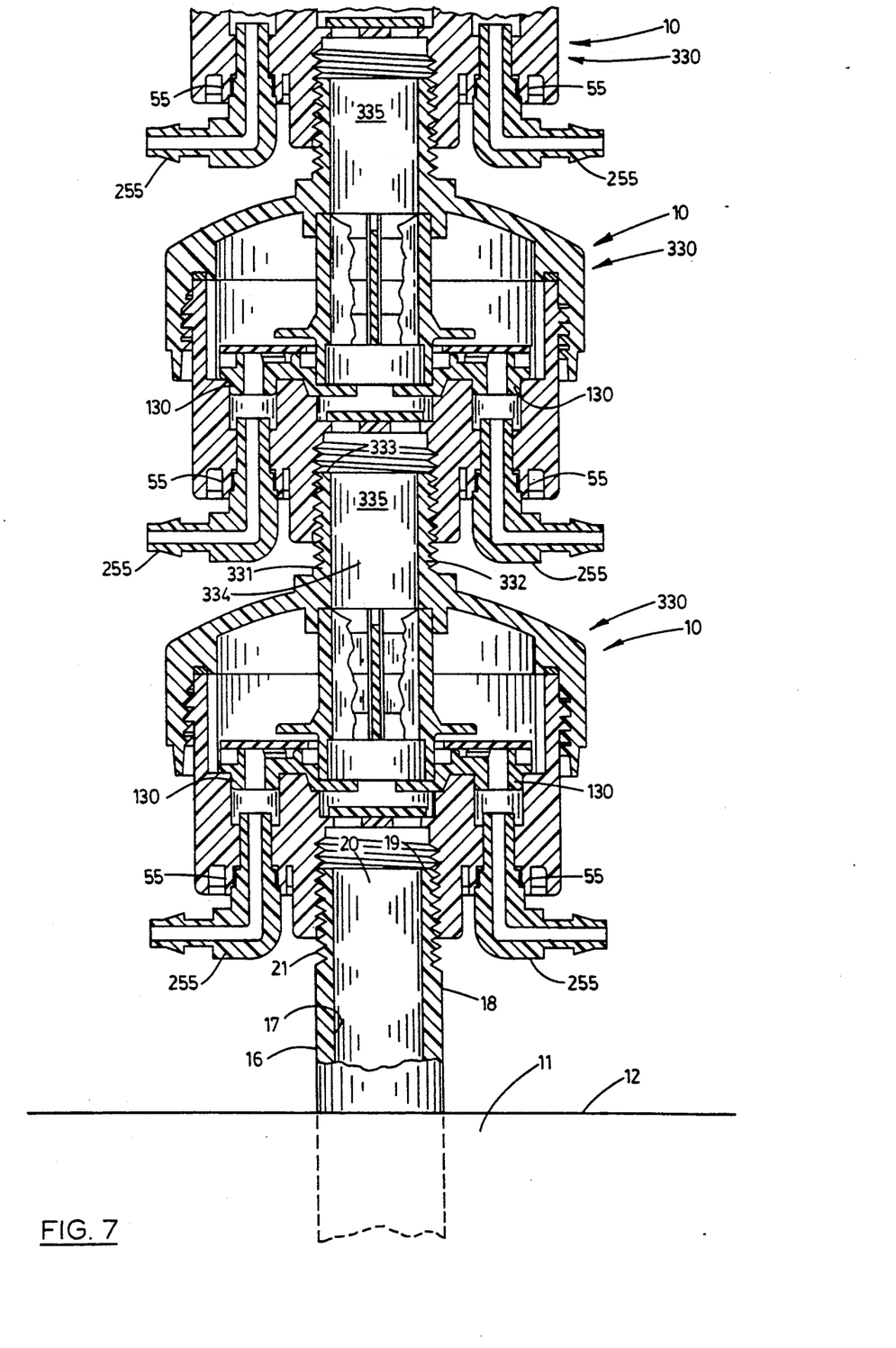
FIG. 7 is a fragmentary transverse vertical section of the second embodiment of the fluid regulating apparatus of the present invention shown in a typical operative environment.

The second embodiment of the fluid regulating apparatus 10 of the present invention is shown in FIG. 7. The second embodiment of the invention is in all respects, except as specified herein, identical to the first embodiment of the invention already described. The second embodiment of the invention has a main housing 330 wherein the lid 235 thereof mounts a male coupling 331 centrally thereof and extending upwardly therefrom. The male coupling is formed by a cylindrical wall 332 mounted on the exterior surface 237 of the dome 236 and extending to an upper annulus 333. A fluid passage 334 defined by a cylindrical surface 335 extends through the male coupling to communicate externally of the apparatus through the upper annulus and extends through the interior surface 238 of the dome to communicate with the internal chamber 71 of the main housing 330.

OPERATION

The operation of the described embodiments of the subject invention is believed to be clearly apparent and is briefly summarized at this point. Referring first to the first embodiment of the invention, shown in FIGS. 1 through 6, the apparatus 10 may most conveniently be considered when assembled in the typical operative environment shown in FIG. 1. The apparatus receives fluid under pressure, under the control of the operator, from a source of fluid under pressure. The conduits 275 are extended from the apparatus to their respective individual destination or target areas where the fluid is to be released. These may most conveniently be considered to be individual plants requiring irrigation.

Referring now more particularly to FIG. 2, when fluid under pressure is delivered to the apparatus 10 by manual or automatic actuation, fluid under pressure is received in the apparatus from the internal passage 17 of the riser 16. The fluid passes into the female coupling 45 and through the opening 89 passing through the web 90. The application of fluid pressure to the underside of the diaphragm 94 elevates the diaphragm within the diaphragm chamber 93 so as to permit passage of the fluid under pressure into the apparatus. The capturing arms 177 of the fluid control elements 130 operate to prevent the diaphragm from passing out of the diaphragm chamber. Thus, fluid under pressure passes into the internal chamber 71 through the core member 215 to pressurize the internal chamber. During such initial pressurization of the internal chamber, the vanes 223 operate to minimize turbulence within the internal chamber while fluid under pressure is passing into the chamber between the upright members 221 and over the scalloped upper edges 225 of the vanes 223. Similarly, the radial flange 220 operates to prevent the flow control diaphragm 200 from being displaced from its position captured between the radial flange and the fluid control elements 130.

The only avenue by which fluid under pressure within the internal chamber 71 of the main housing 30 can escape is through the fluid control elements 130. As a consequence, fluid under pressure passes into the transverse passages 168 of the fluid control elements, along the longitudinal passages 169 thereof, downwardly through the cylindrical passages 138 of the fluid control elements and into the fluid passages 120. The fluid continues to pass from the apparatus 10 by passage along the passages 265 of the elbows 255 and through the passages 277 of their respective conduits 275. The fluid thus passes from the remote ends of the conduits to their respective individual target areas as desired.

Although the fluctuation of fluid pressures received from the fluid source is unavoidable as heretofore explained, the apparatus 10 operates individually to adjust to such fluctuation in fluid pressure to reduce the resultant fluctuation in the volume of fluid flow from the apparatus through the individual conduits 275. This result is achieved by the interoperation of the flow control diaphragm 200 and the fluid control elements 130. Referring more particularly to FIG. 2, as fluid pressure within the internal chamber 71 increases, the flow control diaphragm is pressed downwardly against the fluid control elements. As a consequence, the lower surface 202 of the flow control diaphragm is pressed inwardly of the transverse passages 168 and longitudinal passages 169 of the fluid control elements as well as into the upper annuluses 146. The upper bevelled surfaces 163 and 167 define areas above the transverse and longitudinal passages into which the flow control diaphragm can move thereby making its operation more pressure sensitive. However, the widths of the passages therebelow are sufficiently narrow that the flow control diaphragm cannot completely obstruct the passages.

The extent of impingement of the lower surface 202 of the fluid control diaphragm 200 on the fluid control elements 130 is correlated to the amount of increase of fluid pressure within the internal chamber 71. As fluid pressure is increased, the only passages by which fluid can leave the internal chamber are constricted in correlation therewith. Such constriction of these passages reduces the area through which fluid can pass. Thus, as the velocity of the fluid moving through those passages increases in direct response to the increase in fluid pressure, the volume of the fluid in those passages correspondingly decreases. The converse is also true; that is, as fluid pressure decreases within the internal chamber, the same passages open to a greater degree. Thus, as the velocity of the fluid in the passages reduces, the volume of fluid in the passages increases. As a result, when the pressure of fluid received from the source fluctuates, the apparatus operates automatically to reduce the effect thereof in fluid released through the conduits. An additional benefit in this operation is that relative adjustment between the flow control diaphragm and the fluid control elements allows any foreign matter, such as particles of trash, sand or the like, to be released from the system and thereby substantially avoids clogging of the apparatus. It has thus been found that the apparatus operates automatically to free itself of foreign matter so as substantially more effectively to avoid clogging without the need for using fluid filters within the apparatus which are themselves subject to a variety of operational disadvantages.

As previously noted, another adverse effect of the fluctuation of fluid pressure received from sources thereof is that there is risk of a reversal of direction of fluid flow, known as "back flow", within conventional devices. In the apparatus 10 of the present invention, such reversal of direction of fluid flow is prevented. This is achieved by the diaphragm 94 immediately obstructing the opening 89 the instant that such a reversal of flow is initiated. The diameter of the diaphragm is such as to obstruct and thereby seal the opening 89 defined by the annular lip 88 of the dividing wall 85 once the diaphragm engages the web. Thus, the moment such a reversal is initiated, it is automatically terminated by such interaction of the diaphragm and dividing wall 85.

As previously noted, the fluid control elements 130 are individually snap-fitted in their respective operative positions in the internal chamber 71 of the apparatus 10. They are thus easily removed from their respective operative positions simply by removing the lid 235 from the housing body 31, removing the core member 215 and flow control diaphragm 200 and snapping any one or all of the fluid control elements from their respective operative positions. The purpose for doing so may be to replace or clean one or more of the fluid control elements which is clogged; to replace one or more which are broken; to install one or more with different flow characteristics; or for any other purpose that may be required.

As an additional benefit, each fluid outlet can have a fluid control element 130 tailored to the precise fluid requirements of the particular target area to be served thereby. Thus, all eight (8) of the outlets can have fluid control elements with different flow rates, or any combination thereof. Similarly, as the water needs of each of the target areas changes over time, such as where the plant in the target area grows and therefore requires more water, the fluid control element therefor can be replaced with one having a flow rate correlated to the new requirements of the plant. The variation in the flow rates of the fluid control elements is achieved by having fluid control elements having transverse and longitudinal passages 168 and 169, respectively, of relatively larger or smaller cross-sectional areas.

Once the fluid control elements 130 are installed, or reinstalled, in their respective operational positions, the apparatus 10 is simply reassembled by a reversal of the steps previously described.

Referring more particularly to the second embodiment of the apparatus 10 of the present invention shown in FIG. 7, the operation thereof is substantially identical to that heretofore described in relation to the first embodiment of the invention. The only operative difference between the first and second embodiments of the invention is that two or more apparatuses 10 can be operatively linked, as shown in FIG. 7, permitting the number of outlets from a single fluid source to be multiplied. Thus, in the arrangement shown in FIG. 7, if three such apparatuses are so linked, and if each of the apparatuses has eight (8) fluid outlets, the total number of fluid outlets from the combined assembly, shown in FIG. 7, is twenty-four (24) outlets for a single fluid source. Establishment of the combined assembly shown in FIG. 7 is simply and easily accomplished by simply screw threading the female coupling 45 of the lowermost apparatus on the external screw threads 21 of the riser; screw threading the female coupling 45 of the second apparatus 330 on the male coupling 331 of the first apparatus; and screw threading the female coupling of the last or uppermost apparatus on the male coupling 331 of the second apparatus. Of course, the uppermost apparatus within the combined assembly must have a lid 235 of the first embodiment of the present invention so as to seal the fluid system for operation as heretofore described in relation to the first embodiment of the invention.

Therefore, the fluid regulating apparatus of the present invention permits a multiplicity of fluid outlets individually and independently to be controlled for the release of fluid therefrom; is automatically adjustable to respond to variations in fluid pressure so as to reduce the resultant fluctuation in fluid flow to each target area; prevents a reversal of fluid flow, such as would cause toxic, or otherwise hazardous, substances or particulate matter to be drawn into the system; does not require the use of fluid filters and thereby avoids the problems associated therewith; and otherwise can conveniently and inexpensively be adjusted to vary the quantity of fluid distributed to each target area.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. A fluid regulating apparatus adapted operably to be connected to a source of fluid under pressure, the apparatus comprising a housing having an internal chamber and a plurality of passages individually interconnecting said chamber and the exterior of the housing; means for mounting the chamber of the housing in fluid receiving relation to said source of fluid under pressure; and an assembly mounted in the housing and including a plurality of fluid control elements individually disposed in fluid communication with said passages and each having a channel disposed in fluid communication between its respective passage and the chamber of the housing and a deformable member received in the housing in covering relation to its respective channel deformable in response to fluid pressure within the chamber to impinge upon the channel to constrict the area of fluid movement from the chamber through its respective channel and into the passage thereof thereby being individually operable to reduce the fluctuation in the volume of fluid released from the chamber through the respective passages as fluid pressure is increased.

2. A fluid regulating apparatus adapted operably to be connected to a source of fluid under pressure, the apparatus comprising a housing having an internal chamber and a plurality of passages individually interconnecting said chamber and the exterior of the housing; means for mounting the chamber of the housing in fluid receiving relation to said source of fluid under pressure; and an assembly mounted in the housing and including a plurality of fluid control elements individually disposed in fluid communication with said passages and each having a channel disposed in fluid communication between its respective passage and the chamber of the housing and a deformable member received in the housing in covering relation to its respective channel deformable in response to fluid pressure within the chamber to impinge upon the channel to constrict the area of fluid movement from the chamber through its respective channel and into the passage thereof thereby being individually operable to reduce the fluctuation in the volume of fluid released from the chamber through the respective passages as fluid pressure is increased and wherein said passages and the fluid control elements thereof are disposed in a substantially radial pattern, a frame member is mounted on the housing within the chamber substantially concentric to said radial pattern and said deformable member extends about the frame member for movement therealong to and from an operational position covering said channels of the fluid control elements.

3. The fluid regulating apparatus of claim 2 including a member mounted on the frame member in spaced relation to the fluid control elements to capture said deformable member on the frame member for movement a limited distance from said operational position.

4. The fluid regulating apparatus of claim 3 wherein said housing has a first wall mounted on said source of fluid under pressure for the receipt of said fluid under pressure substantially along an axis of reference, a substantially cylindrical side wall substantially concentric to the axis of reference and a second wall spaced from the first wall to define the chamber between the first wall, side wall and second wall and said frame member extends between the first wall and the second wall substantially axially aligned with said axis of reference.

5. The fluid regulating apparatus of claim 4 wherein said frame member has at least one fluid vane substantially aligned with the axis of reference operable to resist fluid turbulence within said chamber.

6. The fluid regulating apparatus of claim 4 wherein said passages of the housing individually define second axes of reference substantially parallel to and substantially equidistant from the first axis of reference.

7. The fluid regulating apparatus of claim 2 wherein said housing has a first wall mounted on said source of fluid under pressure for the receipt of said fluid under pressure substantially along an axis of reference substantially axially related to said radial pattern, the housing mounts a support frame adjacent to said source of fluid under pressure having an opening of predetermined size therein and a sealing member of a size larger than said predetermined size of the opening whereby fluid movement from the chamber in the direction of the source of fluid under pressure moves the sealing member into obstructing relation to said opening to resist fluid movement from the chamber toward said source of fluid under pressure.

8. The fluid regulating apparatus of claim 7 wherein at least one of the fluid control elements has an arm extending in spaced relation to the support frame to capture the sealing member between the arm and the frame.

9. The fluid regulating apparatus of claim 4 wherein said second wall of the housing mounts a coupling having a fluid passage extending therethrough adapted to receive a second said fluid regulating apparatus thereon for the receipt of fluid under pressure from said source of fluid under pressure.

10. The fluid regulating apparatus of claim 9 wherein each of the passages of each of the fluid regulating apparatuses is adapted individually to mount a fluid distribution conduit capable of extension to an individual location for fluid release.

11. A fluid regulating apparatus capable of distributing fluid from a source of fluid under pressure to a plurality of discreet locations, the fluid regulating apparatus comprising A. a main housing having a housing body mounting a coupling adapted to be mounted on a source of fluid under pressure for the receipt of fluid under pressure from said source substantially along an axis of reference, a plurality of fluid distribution passages extending through the housing body along second axes of reference substantially parallel and radially related to the first axis of reference and a closure adapted removably to be mounted on the housing body in substantially fluid tight relation to define a fluid chamber within the main housing between the housing body and the closure;

B. a plurality of fluid control elements individually, removably snap fastened on the housing body with the fluid chamber and having portions individually received in said fluid distribution passages of the housing body with main passages individually extending therethrough and individually having channels of smaller cross sectional area than their respective main passages facing substantially in the direction of the closure and substantially right-angularly related to the first axis of reference;

C. a core member mounted in the fluid chamber of the main housing extending substantially between the coupling of the housing body and the closure substantially axially related to said first axis of reference and having at least one fluid vane extending through the chamber to resist fluid turbulence within said fluid chamber and a flange extending radially outwardly from the core member in spaced relation to said plurality of fluid control elements;

D. a resilient deformable panel received about said core member between the plurality of fluid control elements and the flange for movement between said flange and an operational positions disposed in covering relation to said channels of the fluid control elements; and E. a plurality of fluid couplings individually mounted on the housing body in individual fluid receiving relation to said fluid distribution passages whereby, upon receipt of fluid under pressure from said source of fluid under pressure, the fluid chamber is pressurized with said fluid under pressure to cause said fluid to pass along the channels of the respective fluid control elements beneath the panel, into the main passages of the fluid control elements through said fluid distribution passages and from the main housing through said fluid couplings and as fluid pressure increases or decreases said panel conversely relatively constricts or enlarges the cross sectional areas of the respective channels to reduce fluctuation in the volume of fluid flow therethrough and from the housing through said fluid couplings.

12. The fluid regulating apparatus of claim 11 wherein said housing body has a secondary chamber adjacent to said coupling and substantially concentric to the first axis of reference and communicating with the fluid source through said coupling through an opening of predetermined size and a diaphragm is captured in the secondary chamber having a size larger than that of the opening whereby any movement of fluid in the direction of the source of fluid under pressure from the fluid chamber causes said diaphragm to obstruct said opening substantially to preclude such fluid movement.

13. The fluid regulating apparatus of claim 11 adapted for use in an assembly that includes said fluid regulating apparatus and at least one other said fluid regulating apparatus interconnected in series relation with the fluid regulating apparatus farthest from said fluid source mounting a closure operable to seal the fluid chamber thereof and the other said fluid regulating apparatus in said series individually mounting a closure having a coupling extending substantially along said axis of reference in a direction opposite to that of coupling of the housing body and interconnected to the coupling of the housing body of the other said fluid regulating apparatus in said series to form said assembly in a unitary, fluid tight configuration operable to distribute fluid through the fluid coupling thereof.

14. A fluid regulating apparatus adapted operably to be connected to a source of fluid under pressure, the apparatus comprising a housing having an internal chamber and a plurality of passages interconnecting said chamber and the exterior of the housing; means for mounting the chamber of the housing in fluid receiving relation to said source of fluid under pressure; a plurality of fluid control elements individually disposed in fluid communication with said passages; and means mounted in the housing responsive to fluid pressure to engage said fluid control elements individually to reduce the fluctuation in the volume of fluid released from the chamber through said passages as said fluid pressure fluctuates.

15. The fluid regulating apparatus of claim 14 including a mechanism mounted in the housing operable to resist fluid movement from said chamber to the source of fluid.

16. The fluid regulating apparatus of claim 15 wherein each of said fluid control elements has a channel, said responsive means is a deformable member engageable upon an increase in fluid pressure in the chamber to impinge upon said channels of the fluid control elements to constrict the area for fluid movement from the chambers through said channels and the passages thereof thereby to reduce the fluctuation in the volume of fluid released from the chamber through said passages as fluid pressure increases.

17. The fluid regulating apparatus of claim 16 wherein each of said channels is defined, at least in part, by surfaces adjacent to the deformable member and convergent upon each other in a direction extending away from the deformable member to define an area into which the deformable member moves during said impingement upon the channel.

* * * * *

UNITED STATES PATENT AND TRADEMARK OFFICE
CERTIFICATE OF CORRECTION

PATENT NO. : 5,222,671

DATED : June 29, 1993

INVENTOR(S) : Howard F. Smiley

It is certified that error appears in the above-identified patent and that said Letters Patent is hereby corrected as shown below:

Column 13, line 27, delete "with" and substitute ---within---.

Column 13, line 48, delete "positions" and substitute ---position---.

Signed and Sealed this

Twenty-fifth Day of January, 1994

Attest:

BRUCE LEHMAN

Attesting Officer    Commissioner of Patents and Trademarks